June 13, 1961 H. J. HERSHEY ET AL 2,988,631

TELEPHONE DIAL LIGHT

Filed June 11, 1959

INVENTORS: H. J. HERSHEY
H. G. JORDAN
W. E. RESTALL, JR.
BY John E. Wagner
ATTORNEY United States Patent Office 2,988,631
Patented June 13, 1961

2,988,631

TELEPHONE DIAL LIGHT

Harold J. Hershey, Homer G. Jordan, and William E. Restall, Jr., Indianapolis, Ind., assignors to Bell Telephone Laboratories, Incorporated, New York, N.Y., a corporation of New York Filed June 11, 1959, Ser. No. 819,678
10 Claims. (Cl. 240—2.1)

This invention relates to telephone substation apparatus and more particularly to dial illuminating arrangements for such apparatus.

It is a general object of this invention to improve telephone dial lighting.

Another object of this invention is to provide dial illumination of comparatively uniform intensity throughout the area of the number plate provided by a localized light source such as a single small incandescent lamp mounted within the telephone set base.

Another object of this invention is to provide such service while allowing for ease of replacement by subscribers of defective dial lamps.

These objects are achieved in accordance with this invention, one embodiment of which comprises a small telephone set of the type disclosed in the Design Patent No. 182,498 of J. N. Burlin et al., issued April 15, 1958.

The telephone set base includes a transparent number plate having a plurality of indicia arranged around the periphery and an overlying finger wheel having openings therein in the arrangement which is well known in the art. Beneath the number plate and within the housing of the base is the dial mechanism. In direct contact with the underside of the number plate is a planar disk of light-transmitting material having a skirt extending around the periphery of the disk and down perpendicular to the number plate. The skirt, which is joined to the planar surface by a beveled corner, includes one discontinuity in the shape of a rectangular cut-out in the bottom edge as well as a second bevel in the region between the cut-out and the planar surface. Positioned within the cut-out is the tip of a small incandescent lamp with the filament of the lamp in comparative alignment with the side walls of the cut-out constituting a part of the skirt.

One feature of this invention relates to the presence of a light guide of comparable size to the number plate in close proximity to its entire surface for diffusing light into the number plate.

Another feature of this invention relates to the presence of an integral skirt portion of the light guide for conducting light from a source positioned in a cut-out in the skirt.

Another feature of this invention relates to the relative positioning of the light source with respect to the skirt of the light guide and its contour whereby a larger quantity of the light radiated from the bulb is introduced into the skirt portion for conduction around and reflection into the planar portion than is directed to the planar portion in the immediate area of the light source.

This invention may be more clearly understood from the following detailed description and by reference to the drawing in which.

Figure 1:
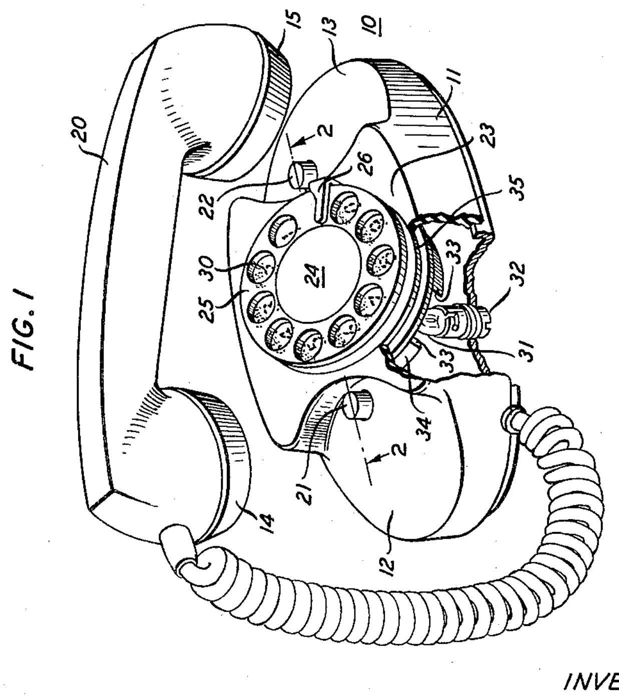
FIG. 1 is a perspective view of a small telephone set with portions cut away to show the dial lamp position.

Referring now to FIG. 1, the telephone set 10 of FIG. 1 is a small lightweight telephone base 11 of oval shape having a pair of end steps 12 and 13 upon which rest the transmitter and receiver caps 14, and 15, respectively, of a telephone handset 20 when at rest on switchhook plungers 21 and 22 passing through the housing on the steps 12 and 13. On a raised central portion 23 of the base 11 is the call transmitter or dial 24.

The dial may be seen as including a conventional finger wheel 25, a finger stop 26, a number plate 30 with indicia thereon, and in the broken-away portion, a lamp 31 and socket 32 within the base 11 under the number plate 30 and positioned in line with the ends 33 of a peripheral skirt 34 of a light-conducting member 35 hereinafter described in more detail. The lamp is held in the socket 32 and is readily accessible for replacement by removing the socket 32 through an opening in the underside of the telephone set 10.

Figure 4:
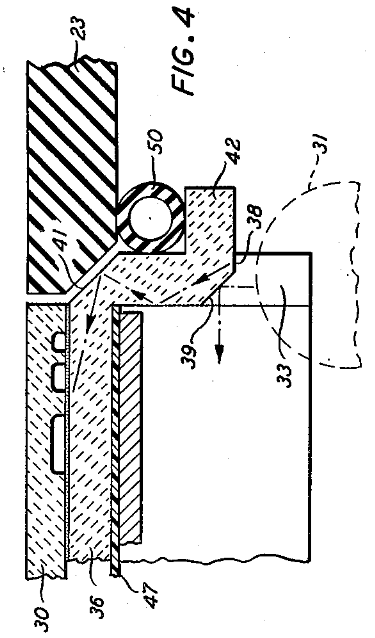
FIG. 4 is an enlarged fragmentary section of the dial of FIG. 3 along line 4—4.
Figure 2:
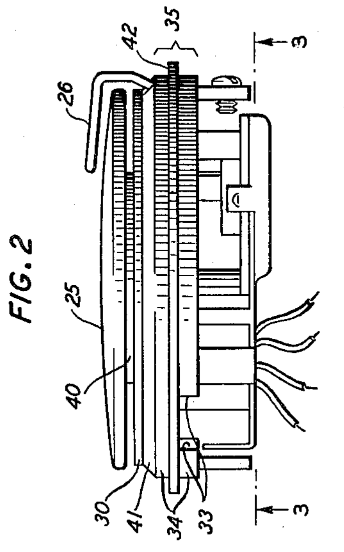
FIG. 2 is an elevational view of the dial of the telephone set of FIG. 1.

FIG. 2 shows the dial of FIG. 1 as including the finger wheel 25 which is preferably transparent, mounted for rotation by the central hub 40 and for return by a return spring thereunder, unshown in the drawing. The finger wheel 25 overlies and is spaced from the number plate 30 which similarly is transparent and includes engraved indicia on the underside appearing in FIG. 4 as indentations. In juxtaposition to the underside of the number plate 30 is the light-conducting member 35 including a planar disk portion 36 appearing in FIG. 4 of comparable size to the number plate 25 and having a matte or lusterless finish on its upper and lower surfaces. The light-conducting member 35, advantageously molded from a plastic such as polymethyl methacrylate, known as the commercial product "Lucite" of the E. I. du Pont de Nemours & Co., includes a peripherally beveled portion 41 extending outward from the edge of the number plate and terminating in the peripheral skirt 34, giving the light-conducting member an over-all appearance of an inverted cup. An integral flange or ring 42 on the member encircles the skirt and forms a stop which rests against a ring gasket 50 adjacent to the underside of the portion 23 of the base 11, as best seen in FIG. 4. The ring gasket 50 prevents the admission of dirt and the leakage of light from the interior. The peripheral skirt of member 35 is continuous throughout the periphery except for one cut-out, of sufficient size to accommodate the bulb 31 employed for the dial lighting. The three surfaces of the light-conducting member adjacent the bulb 31, including the underside of the flange portion 42 and the ends 33 of the skirt portion form the points of light input to the member 35 and to the entire dial-lighting system.

Figure 3:
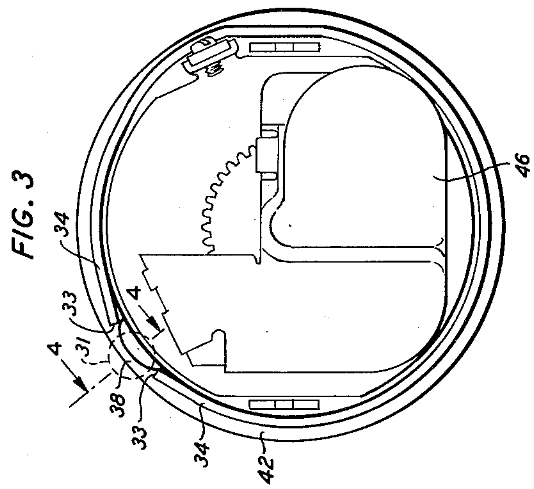
FIG. 3 is a showing of the rear of the dial.

Underlying the member 35 is the electromechanical assembly of the dial including the gear train, governor, pulsing contacts more easily seen in FIG. 3, all mounted on a frame and covered by a cover plate 46.

The spatial arrangement of the lamp and the three points of light input to the conductive member may be more clearly seen in FIGS. 3 and 4. Therein the lamp 31 is shown dotted and in alignment with the end surfaces 33 of the skirt 34. These planar surfaces 33 form readily admitting areas for light into the skirt 34 which in turn form an efficient light-conducting path around the periphery for reflection by the beveled portion 41 up to the periphery of the planar portion 36 of member 35 and for diffusion through its upper matte surface to the number plate 30.

Light from the filament of the lamp is introduced directly into the skirt end portions 33, one of which is shown, and into the narrow restricted entrance 38 directly above the lamp 31. The area of the surface 38 is reduced by bevel 39 which constitutes a surface for externally reflecting incident light from the lamp 31, and thereby restricts the admission of light into the member 35 in the region of the lamp 31. The relative areas of the end surfaces 33 of the skirt 34 and the surface 38 may be seen in FIG. 4. In both cases light rays transmitted into the member 35 are conducted up by internal reflections and upon reaching the beveled surface 41 are reflected up to the planar portion 36 of the member and upon striking the matte surface are diffused into the number plate providing the required lighting. This introduction of light into the number plate is augmented by a reflective layer 47 such as a disk of white plastic material under the planar portion 36.

The configuration of the member 35 favors the transmission of light from a localized source around the periphery of the number plate rather than directly to the number plate from the lamp and affords more even distribution of light for the dial.

Employing this invention, a simple small local lamp, readily accessible from the underside of the telephone set 10 provides substantially uniform illumination over the entire surface of the number plate 30. Such uniform lighting has heretofore only been accomplished by multiple or circular lamps arranged around the periphery. Furthermore, the configuration of the light-conducting member is such that the increase in volume of the entire dial, a factor which is of extreme importance in small telephone sets, is virtually negligible and, in fact, the member provides an additional function which otherwise would have to be provided by another element, to wit, furnishes an integral stop 42 for the base assembly 11. The configuration of the cut-out in the skirt is simple but provides selective transmission in a manner which avoids the characteristic bright spot in the region of the lamp found in dial lighting arrangements heretofore using a single small lamp.

In all cases it is understood that the above-described arrangements are merely illustrative of the principles of the invention. Numerous and varied other embodiments may be devised in accordance with these principles by those skilled in the art without departing from the spirit and scope of the invention.

What is claimed is:

1. Dial plate illuminating means comprising a light-conducting member having a planar portion underlying and in juxtaposition to said dial plate, a skirt portion extending around the periphery of said planar portion, a beveled portion joining said planar portion to said skirt portion, an aperture in said skirt portion, a light source in said aperture, the surface of said aperture disposed between said planar portion and said light source being beveled in such manner as to externally reflect a substantial portion of light directed toward said planar portion to provide a restricted light path in said direction, the remaining surfaces of said aperture being such as to provide substantially unrestricted light paths along the periphery of said skirt portion.

2. Dial plate illuminating means in accordance with claim 1 wherein said beveled portion joining said planar portion to said skirt portion comprises a surface for internally reflecting light from said skirt portion to said planar portion.

3. Dial plate illuminating means in accordance with claim 1 wherein the surface of the planar portion adjacent said dial plate is of such nature as to diffuse light from said planar portion through said dial plate.

4. Dial plate illuminating means in accordance with claim 1 wherein the surface of the planar portion adjacent said dial plate is of such nature as to diffuse light from said planar portion through said dial plate, and the other surface of said planar portion is disposed adjacent a light reflecting member.

5. Dial plate illuminating means in accordance with claim 1 wherein a flange member integral with said light-conducting member and encircling said skirt is disposed between said planar portion and said aperture.

6. A light-conducting member comprising a cup-shaped unitary body including a planar portion, a skirt portion extending around the periphery of said planar portion, a peripherally beveled portion joining said planar portion to said skirt portion, an aperture in said skirt portion, a light source in said aperture, the surface of said aperture disposed between said planar portion and said light source being beveled in such manner as to externally reflect a substantial portion of light directed toward said planar portion to provide a restricted light path in said direction, the remaining surfaces of said aperture being such as to provide substantially unrestricted light paths along the periphery of said skirt portion.

7. A light-conducting member in accordance with claim 6 wherein said peripherally beveled portion comprises a surface for internally reflecting light from said skirt portion to said planar portion.

8. A light-conducting member in accordance with claim 6 wherein said planar portion has at least one light diffusing surface.

9. A light-conducting member in accordance with claim 6 wherein a flange member integral with and encircling said skirt portion is disposed between said planar portion and said aperture.

10. A light-conducting member in accordance with claim 6 wherein the outer surface of said planar portion is of such nature as to diffuse light and the inner surface of said planar portion is disposed adjacent a light-reflecting member.

References Cited in the file of this patent

UNITED STATES PATENTS

| | | |
|---|---|---|
| 2,365,864 | Chapman | Dec. 26, 1944 |
| 2,561,881 | Oetting | July 24, 1951 |
| 2,765,555 | Gits et al. | Oct. 9, 1956 |
| 2,837,052 | Vivet | June 3, 1958 |